United States Patent [19]

De Boer

[11] 3,813,559

[45] May 28, 1974

[54] NOISE REDUCTION CIRCUIT

[75] Inventor: Jacob De Boer, Emmasingel, Eindhoven, Netherlands

[73] Assignee: U.S. Philips Corporation, New York, N.Y.

[22] Filed: Sept. 28, 1972

[21] Appl. No.: 293,121

[30] Foreign Application Priority Data

Mar. 30, 1972 Netherlands ....................... 7204290

[52] U.S. Cl. ................. 307/237, 328/162, 328/171, 330/20, 330/149, 333/14

[51] Int. Cl. ........................... H03k 5/08, H04b 1/10

[58] Field of Search ............ 307/235, 237; 328/169, 328/171, 162; 333/14; 330/20, 149

[56] References Cited

UNITED STATES PATENTS

| | | | |
|---|---|---|---|
| 3,564,297 | 2/1971 | Elsner | 307/268 X |
| 3,654,488 | 4/1972 | Traub et al. | 307/237 |

*Primary Examiner*—John Zazworsky

*Attorney, Agent, or Firm*—Frank R. Trifari; Henry I. Steckler

[57] ABSTRACT

A noise reduction circuit has a transistor and impedance elements coupled to its emitter and collector respectively and an input signal applied to its base. The impedance of the collector impedance element is a function both the amplitude and frequency of the input signal. It can be another transistor and a variable bandpass filter. A switch can be part of the circuit so that it can be used during both recording and reproducing.

12 Claims, 9 Drawing Figures

NOISE REDUCTION CIRCUIT

BACKGROUND OF THE INVENTION

Figure 1:
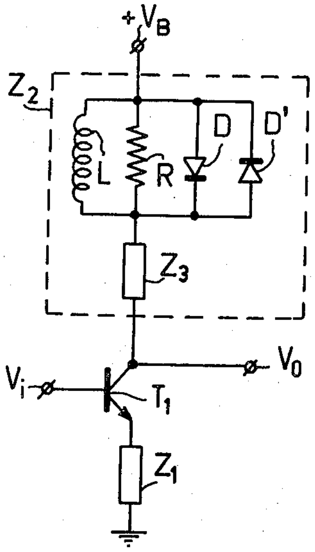

The present invention relates to a circuit that has a transfer function that is a function of both the amplitude and frequency of the input signal, and more particularly, to one that can be used during both magnetic recording and reproducing to reduce noise.

In magnetic recording, a signal, which can correspond to audio, video or other information is applied to a magnetic head which magnetizes areas of an adjacent moving magnetic record in accordance with the frequency and amplitude of the applied signal. During reproduction, the record moves past the head, inducing an electrical signal therein, which is a substantial reproduction of the original signal. Unfortunately, the record also introduces noise into the reproduced signal, which is highly annoying to a listener or an observer.

This noise is however non-uniformly distributed with respect to frequency, which allows a compressor-expander type noise reduction circuit to be used. This circuit has a transfer function such that signals having a small amplitude and a frequency in the vicinity of the frequency of the noise introduced by the record are boosted. As a result, the signal-to-noise ratio of the signal recorded on the magnetic record carrier will be increased, and the information signal will be distorted because of this frequency-dependent and amplitude-dependent transfer function. When the signal is played back this distortion must obviously be eliminated, and therefore the output signal from the reproducing head is applied to an expander circuit which has a transfer function which is complementary to that of the compressor circuit. Consequently the original signal is obtained in the undistorted condition. However, the noise which is caused by the record and the information signals which have a corresponding frequency and originally had a small amplitude will be particularly reduced, so that the improved signal-to-noise ratio of the signal is retained during playback.

Obviously, to achieve distortion free playback of the signal it is of particular importance that the transfer functions of the two signal transmission devices, the compressor and the expander, are complementary to one another as exactly as possible. The stringency of this requirement increases with an increase in complexity of the transfer function of the compressor and expander with respect to dependence upon amplitude and frequency. A high degree of complexity usually is desirable to obtain effective noise reduction, but this will cause the required circuits to be more critical and possibly cause instabilities in any feedback loops used to obtain the transfer function.

It is therefore an object of the present invention to provide a circuit having a transfer function that varies with both frequency and amplitude.

It is another object to provide a noise reduction circuit.

It is yet another object to provide a single unit noise reduction circuit that can be used for both compression and expansion so as to obtain exactly complementary transfer functions.

It is a further object to provide such a circuit that can be made by integrated circuit techniques.

It is yet a further object to provide such a circuit that is stable.

SUMMARY

In brief, these and other objects are achieved by a circuit having a controlled source which includes a control and main conduction electrodes. An input signal is applied to said control electrode. An amplitude and frequency varying impedance element is coupled to one of said conduction electrodes and another impedance element is coupled to the other conduction electrode. An output signal is derived from one of said impedance elements. The circuit therefore has a transfer function that varies with both frequency and amplitude, and hence can be used as a compressor or expander for noise reduction. A switching means can be added to change the locations to which the input signal is applied and from which the output signal is derived so that the circuit can be used as both a compressor and an expander. Hence the transfer functions will be identical and the circuit will be small and suitable for manufacture as an integrated circuit.

Figure 2:
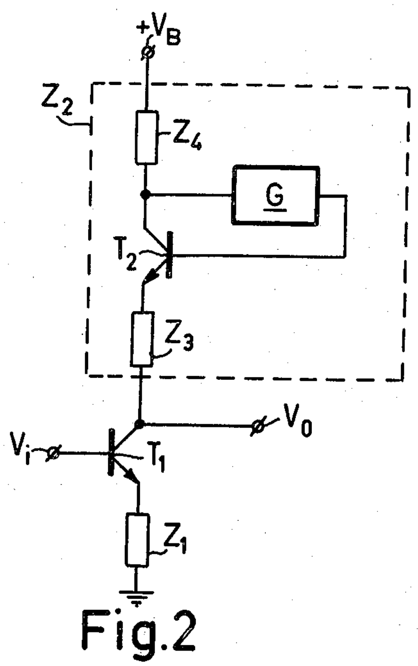
Figures 3, 4:
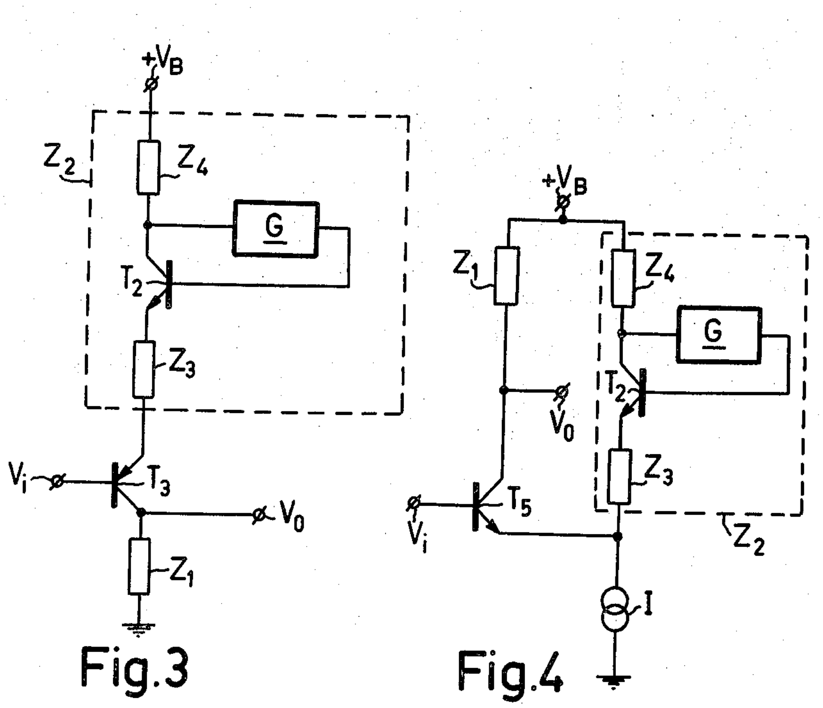
Figure 5:
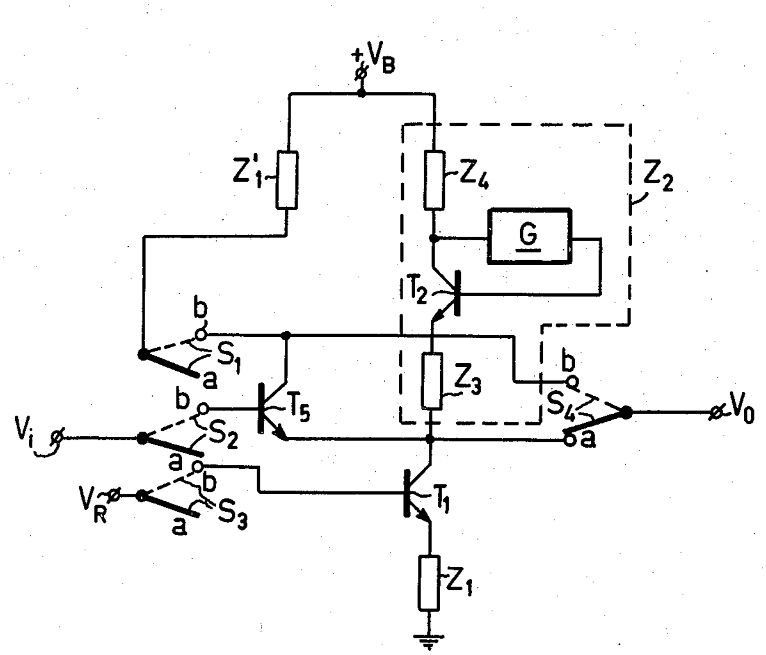
Figure 6:
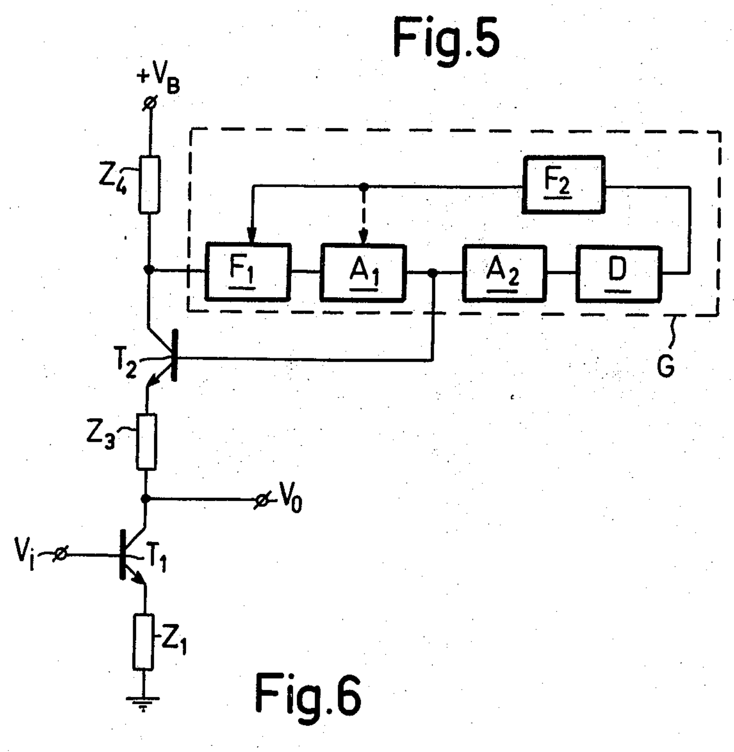
Figure 7:
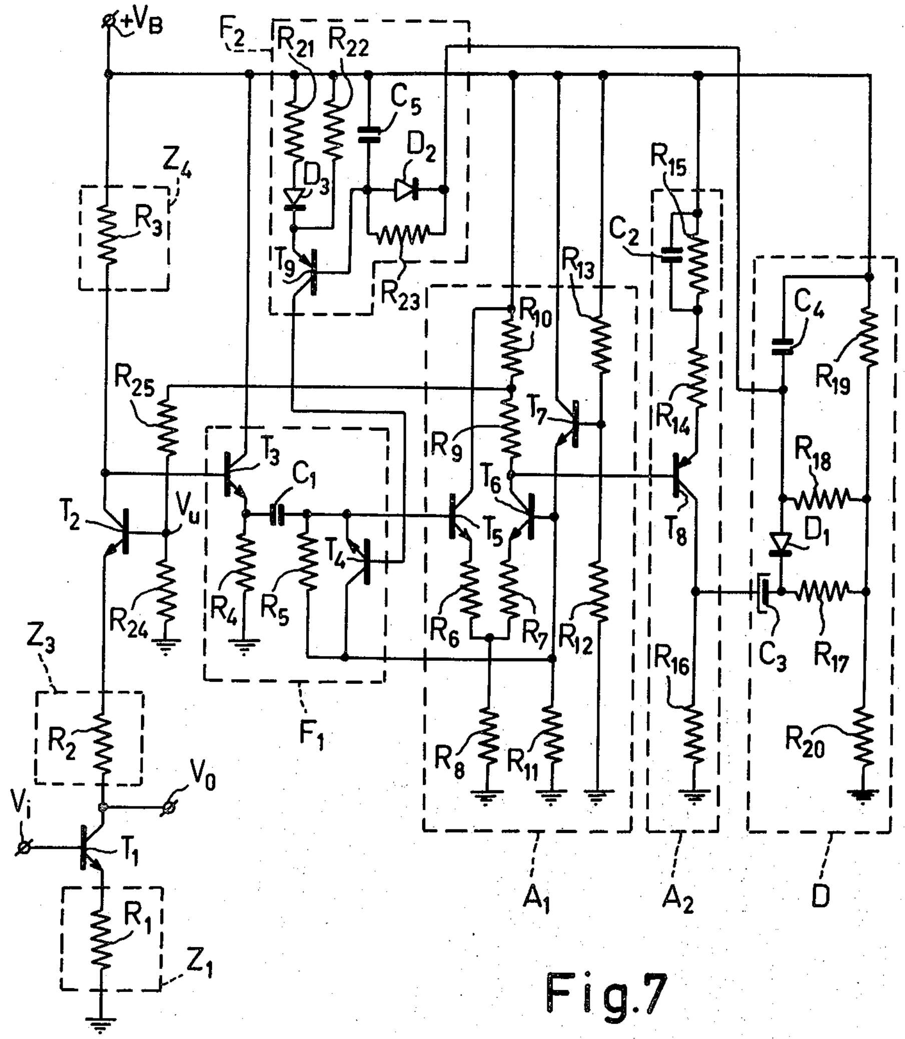
Figure 8:
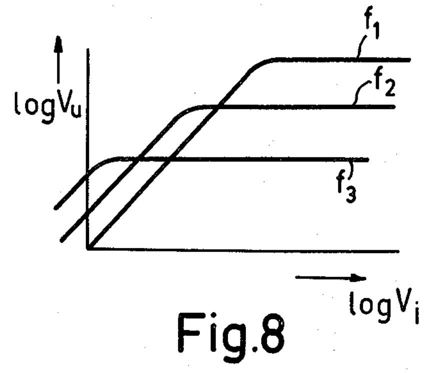
Figure 9:
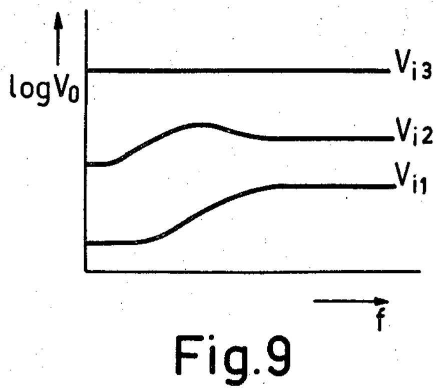

Other objects, advantages, and features will become apparent from the description when taken in conjunction with the accompanying drawings in which:

FIG. 1 shows a first embodiment of the transmission device according to the invention, FIG. 2 shows an embodiment having the same structure but a second impedance element of different design, FIGS. 3 and 4 show two embodiments which each have a transfer function complementary to that of the device shown in FIG. 2, FIG. 5 shows a combined circuit by means of which two mutually complementary transfer functions are obtainable, FIG. 6 shows a more elaborate structure of the network in a preferred embodiment of the invention, FIG. 7 shows an embodiment largely suitable to be manufactured in integrated circuit form, and FIGS. 8 and 9 illustrate the frequency-dependent and amplitude-dependent behaviour of this embodiment.

In the Figures corresponding elements are designated by like reference symbols.

The signal transmission device shown in FIG. 1 comprises a transistor $T_1$ of the npn-type. The emitter of this transistor $T_1$ is connected to the negative terminal of the supply source, for example to ground, via a first impedance element $Z_1$. The collector of the transistor $T_1$ is connected to the positive terminal $+V_B$ of the supply source via a second impedance element $Z_2$. The input signal $V_i$ is applied to the base of the transistor $T_1$ and the output signal $V_o$ is derived from the collector of the transistor $T_1$.

The impedance of element $Z_2$ is a function of both amplitude and frequency because it comprises the parallel combination of an inductance L, a resistor R and two diodes D and D′ connected in inverse parallel. The impedance element $Z_2$ further comprises an impedance $Z_3$ connected in series with the said parallel combination. This design of the impedance element $Z_2$ may be used, for example in a system for the reduction of noise in a video signal, in which use the non-linear distortion produced by this design will in general be permissible.

For audio uses, in which this distortion will in general not be permissible, the impedance element $Z_2$ may have a structure as shown in FIG. 2. In the embodiment shown in this FIG. the impedance element $Z_2$ comprises an impedance $Z_4$, the collector emitter path of a transistor $T_2$ of the npn-type, and an impedance $Z_3$, which are connected in series between the terminal $+V_B$ and the collector of the transistor $T_1$. The impedance element $Z_2$ further comprises a network G which receives a signal from the impedance $Z_4$ and applies a first control signal derived from this signal to the base of the transistor $T_2$. The structure of the signal transmission device shown in FIGS. 1 and 2 has the advantage that it enables the complementary transfer function to be simply realized with the use of the same impedance element $Z_2$. This will be proved by calculating the transfer function of the device shown in FIG. 2.

Neglecting the base-emitter voltage of the transistor $T_1$ and the output current, the signal current in the series circuit comprising the impedances $Z_1$, $Z_3$, $Z_4$ and the main current paths of the transistors $T_1$ and $T_2$ will be equal to $V_i/Z_1$. On the basis of this signal current the control voltage applied to the base of the transistor $T_2$ is $-(Z_4 g/Z_1)\ V_i$, where g is the transfer function of the network G. Neglecting the base-emitter voltage of the transistor $T_2$, the emitter voltage has the same value and the output signal $V_o$ is:

$$V_o = -(Z_3 + gZ_4/Z_1)\ V_i \quad (1)$$

This expression shows that the frequency-dependent and amplitude-dependent nature of the transfer function is determined by the impedances $Z_1$, $Z_3$ and $Z_4$ and also by the transfer function $g$ of the network G. Hence, the impedances $Z_1$, $Z_2$ and $Z_3$ may be in the form of resistors, while the variations of the transfer functions are mainly determined by the network G. However, as an alternative, one or more of the impedances $Z_1$, $Z_2$ and $Z_3$ may be made frequency-dependent and, if desired, amplitude-dependent. The impedance $Z_3$ may even be entirely dispensed with. If comparatively complex transfer functions are to be synthesized, it will in general be preferable for the frequency dependence and the amplitude dependence to be largely determined by the network G.

As has been mentioned hereinbefore, it is highly desirable that in achieving the complementary transfer function the same elements can be used, in particular the elements which primarily determine the transfer function, i.e. the impedances $Z_1$, $Z_3$, $Z_4$ and the network G. Because of the choice of the design of the signal transmission device this may simply effected in a variety of manners, two examples being shown in FIGS. 3 and 4.

The embodiment shown in FIG. 3 substantially corresponds to the device shown in FIG. 2. The single difference from the circuit shown in FIG. 2 consists in that the transistor $T_1$ of the npn-type has been replaced by a transistor $T_3$ of the pnp-type, which naturally entails that the collector and emitter connections have changed positions. In this embodiment, the input signal $V_i$ is applied to the base of this transistor and the output signal $V_o$ is derived from its collector, which here is connected to the impedance $Z_1$. A simple calculation shows that the relationship between the input signal and the output signal for this device is given by $$V_o = -\ (Z_1/Z_3 + g.\ Z_4)\ V_i \quad (2),$$

which relationship obviously is fully complementary to the transfer function of the device shown in FIG. 2. If an impedance element $Z_2$ is used which corresponds to the element $Z_2$ shown in FIG. 1, the device shown in FIG. 3 will obviously have a transfer function which is complementary to that realized by the device shown in FIG. 1.

For a noise reduction system for use in a tape recorder in which during recording, the signal is to be compressed, and during playback the signal is to be expanded, this means that the same impedance elements $Z_1$ and $Z_2$ may be used for both modes and that the desired mode may be selected by switching either a transistor $T_1$ (FIG. 2) or a transistor $T_3$ (FIG. 3) into circuit.

A transfer function complementary to that of the device shown in FIG. 2 may also be obtained by connecting the impedance element $Z_2$ in the emitter circuit and the impedance element $Z_1$ in the collector circuit and replacing the npn-transistor $T_2$ by a pnp-transistor. This circuit has the disadvantage that the impedance element $Z_2$ is changed.

FIG. 4 shows a third circuit for achieving a complementary transfer function. This circuit also comprises an impedance element $Z_2$, a first terminal of which here is also connected to the positive terminal $+V_B$ of the supply source. However, the second terminal is connected to ground via a current source I and to the emitter of a transistor $T_5$ of the npn-type. To the base of transistor $T_5$, the input signal $V_i$ is applied. The collector of the transistor $T_5$ is connected to the positive terminal of the supply source via the impedance $Z_1$. From impedance $Z_1$, the output signal $V_o$ is derived.

The impedance $Z_1$, the transistor $T_5$ and the impedance element $Z_2$ here also form a series circuit with respect to the signal current, because the current source I supplies a constant current. Again the formula (2) is simply found for the transfer function. The advantage of the device shown in FIG. 4 is that only transistors of the npn-type are used, the moreover this device may advantageously and simply be combined with the device shown in FIG. 2, as is illustrated in FIG. 5.

The device shown in this Figure again comprises the impedance element $Z_2$, which is connected in series with the collector emitter path of the transistor $T_1$ and the impedance $Z_1$ between the positive terminal $+V_B$ and ground. The device further comprises a transistor $T_5$ the emitter of which is connected to the collector of the transistor $T_1$. A switch $S_2$ enables the input signal $V_i$ to be selectively applied to the base of the transistor $T_1$ or to the base of the transistor $T_5$, while a switch $S_4$ enables the output signal $V_o$ to be selectively derived from the collector of the transistor $T_1$ or from the collector of the transistor $T_5$. The said switches $S_2$ and $S_3$ are ganged with one another, so that all the switches $S_1$ and $S_4$ occupy either the positions designated by *a* or the positions designated by *b*. When in the position *b* the switch $S_1$ connects the collector of the transistor $T_5$ to one terminal of the impedance $Z'_1$. The other terminal of impedance $Z'_1$ is connected to the positive terminal $+V_B$ of the supply source. The switch $S_3$ when in the position *b* connects the base of the transistor $T_1$ to a reference voltage $V_R$.

It will be clear that when the switches $S_1$ to $S_4$ are in the position *a* the operative part of the device is identical to the device shown in FIG. 2. When the switches are in the position $b$, a fixed reference voltage $V_R$ is applied to the base of the transistor $T_1$. This means that the collector current of the transistor $T_1$ then is constant and consequently this transistor acts as a current source. Hence it will readily be appreciated that in this case the operative part of the device is identical to the device shown in FIG. 4. If the two transfer functions are required to be complementary, the only requirement to be satisfied is that the impedances $Z'_1$ and $Z_1$ are equal. Therefore these impedances may expediently be resistors, because resistors may simply be made exactly equal, so that the frequency-dependent and amplitude-dependent characteristic is primarily determined by the impedance element $Z_2$. Thus, changing over the switches $S_1$ to $S_4$, which obviously may take the form of electronic switches, enables a complementary transfer function to be selected, according to whether a signal is recorded or a recorded signal is played back, and this selection also may obviously be performed automatically.

FIG. 6 shows the device of FIG. 2 in which, by way of example, the structure of the network G is shown schematically. This network G includes a filter $F_1$, for example a high-pass filter. The output signal of this filter is applied via an amplifier $A_1$ to the base of the transistor $T_2$. The output signal of the amplifier $A_1$ is also applied to a second amplifier $A_2$ which may have a frequency-dependent amplification factor. The amplitude of the output signal of the amplifier $A_2$ is measured by means of a detector D and the measured value is applied to a non-linear filter $F_2$ which may have a nature which is both frequency-dependent and amplitude-dependent. The output signal of this filter $F_2$ is applied to a control input of the filter $F_1$ the cut-off frequency of which is controllable by means of the signal applied to this control input. Alternatively, the amplifier $A_1$ may be controllable, its amplification factor depending upon the signal applied to its control input, which is indicated by a broken line. This schematically shown structure of the network G enables a wide variety of transfer functions to be realized in accordance with the instantaneous purpose.

FIG. 7 shows an embodiment of a device as shown in FIG. 6 which is highly suitable for manufacture in integrated-circuit form and is particularly suited for use in audio tape recorders, and FIGS. 8 and 9 show characteristics of this device.

In FIG. 7 the elements of the network G as shown in FIG. 6 are enclosed in broken-line boxes. The device as shown in FIG. 7 includes a transistor $T_1$ to the base of which the input signal $V_i$ is applied and from the collector of which the output signal $V_o$ is derived. The impedances $Z_1$, $Z_3$ and $Z_4$ in the series circuit between ground potential and the positive terminal $+V_B$ of the supply source are constituted by resistors $R_1$, $R_2$ and $R_3$. This series circuit further comprises the collector emitter path of the transistor $T_2$ connected between the resistors $R_3$ and $R_2$.

The signal voltage produced across the resistance $R_3$ is applied to an emitter follower circuit which comprises a transistor $T_3$ and a resistor $R_4$ and forms part of a high-pass filter $F_1$. The filter action is obtained by means of an RC network comprising a capacitor $C_1$ and a resistor $R_5$. The filter $F_1$ further comprises a transistor $T_4$ in inverse connection, the collector emitter path of which shunts the resistor $R_5$ and to the base of which a control signal is applied. The impedance introduced by this transistor in parallel to the resistor $R_5$ obviously influences the RC time constant, and hence the cut-off frequency of the filter ($C_1$, $R_5$, $T_4$), so that this cut-off frequency depends upon the control signal applied to the base of the transistor $T_4$.

The output signal of this high-pass filter $F_1$ is applied to an amplifier $A_1$. This amplifier $A_1$ includes a differential stage which comprises transistors $T_5$ and $T_6$ emitter impedances $R_6$ and $R_7$ and a common emitter impedance $R_8$. The output signal of the filter $F_1$ is applied to the base of the transistor $T_5$, and to the base of the transistor $T_6$ there is applied a reference voltage which is obtained by means of a voltage divider $R_{12}$, $R_{13}$ and an emitter follower circuit comprising a transistor $T_7$ and a resistor $R_{11}$. The differential pair $T_5$ and $T_6$ may be biased so as to provide a desired amplitude limitation of the signal. The resistor $R_{11}$ is also connected to the resistor $R_5$. A voltage divider $R_9$ and $R_{10}$ is connected in the collector circuit of the transistor $T_6$. From the tap on this voltage divider an output signal is derived which is applied to a voltage divider $R_{24}$, $R_{25}$ the tap on which is connected to the transistor $T_2$.

A second output signal of the amplifier $A_1$ is derived from the collector of the transistor $T_6$ and applied to an amplifier $A_2$. This amplifier $A_2$ has a frequency-dependent amplification factor, because the parallel combination of a resistor $R_{15}$ and a capacitor $C_2$ is connected via a resistor $R_{14}$ to the emitter of a transistor $T_8$ of the pnp-type. The output signal of this amplifier $A_2$ is derived, via a capacitor $C_3$, from a collector resistor $R_{16}$ of the transistor $T_8$.

The output signal of the amplifier $A_2$ is applied to the detector D which comprises resistors $R_{17}$, $R_{18}$, $R_{19}$, $R_{20}$, a capacitor $C_4$, and a diode $D_1$. The voltage across the capacitor $C_4$ always is a function of the amplitude of the output signal of the amplifier $A_2$. This voltage across the capacitor $C_4$ is applied to a non-linear filter $F_2$.

This filter includes a RC network which comprises a capacitor $C_5$ and a resistor $R_{23}$, to which the voltage across the capacitor $C_4$ is applied. The resistor $R_{23}$ is shunted by diode $D_2$ connected in the conducting direction, so that the transfer function of this RC network is not only frequency-dependent but also amplitude-dependent. The tap on this RC network is connected to the base of a transistor $T_9$ of the pnp-type in the emitter lead of which are connected a resistor $R_{21}$ and a diode $D_3$ which are shunted by a resistor $R_{22}$. The output signal of this filter $F_2$, in this case the collector current of the transistor $T_9$, is applied to the control input of the filter $F_1$, in this case the base of the transistor $T_4$, and thus controls the cut-off frequency of the high-pass filter $F_1$.

The transfer function produced by this device, which function consequently has a nature which is both frequency-dependent and amplitude-dependent, is shown in FIGS. 8 and 9. FIG. 8 shows on a logarithmic scale the voltage $V_u$ at the base of the transistor $T_2$ as a function of the amplitude of the input signal $V_i$ for three frequencies of this input signal, where $f_1<f_2<f_3$. FIG. 9 shows on a logarithmic scale the output signal $V_o$ as a function of the frequency for three values of the amplitude of the input signal, where $V_{i3}>V_{i2}>V_{i1}$.

Obviously the circuit arrangement shown in FIG. 7 may be varied in many ways, thus enabling the transfer function achieved by the device to be matched to a particular requirement, without departing from the scope of the invention.

Furthermore, by way of example, the structure of the impedance element $Z_2$ which is shown in FIGS. 2, 3, 4 and 5 and in which the main current path of the transistor $T_2$ is connected in series with the impedance $Z_4$ may be modified by using a structure in which the main current path of this transistor is connected in parallel with this impedance $Z_4$. In this case the transistor $T_2$ must be of a conductivity type opposite to that of $T_1$ and have its emitter connected to that terminal of the impedance $Z_4$ which in turn is connected to the positive terminal $+V_B$ of the supply source. Variation of the control voltage at the base of this transistor naturally varies the impedance of the parallel combination of this transistor and the impedance $Z_4$.

Additionally, it will be clear that, although in the embodiments shown only bipolar transistors are used, unipolar transistors or tubes may also be used. It will also be appreciated that although the present invention has been described as having a utility in magnetic recording, it can be used in many information and communication systems for noise suppression.

What is claimed is:

1. A circuit comprising a controlled source having a main conduction path and a control electrode, an input means for receiving an input signal induding noise coupled to said control electrode, a series circuit having a signal current flowing therethrough and comprising in succession first impedance means, said conduction path and second impedance means, means for reducing said noise in said input signal comprising said second impedance means having an impedance that is a varying function of both the amplitude and frequency of the signal applied thereto, and an output means coupled to one of said impedance means for supplying an output signal, whereby the transfer function between said input and output means is a function of both the frequency and amplitude of said input signal.

2. A circuit as claimed in claim 1 wherein said second impedance means further comprises an amplitude independent impedance element whereby the total impedance of said second impedance means has an amplitude independent component.

3. A circuit as claimed in claim 1 wherein said second impedance means further comprises a second controlled source having a control electrode and a main current path coupled in said series circuit, and network means coupled to receive said signal current for applying a first control signal to said second source control electrode.

4. A circuit as claimed in claim 3 wherein said network means comprises a control element means for generating a second control signal that is a function of said signal current, and a variable element means having a control input means coupled to said control element means to receive said second control signal for varying the transfer function of said variable element means.

5. A circuit as claimed in claim 4 wherein said variable element means comprises a controllable filter.

6. A circuit as claimed in claim 4 wherein said variable element means comprises a controllable amplifier.

7. A circuit as claimed in claim 4 wherein said control element means comprises means for detecting said first control signal to produce said second control signal.

8. A circuit as claimed in claim 4 wherein said network further comprises a non-linear filter coupled between said control element means and said variable element means.

9. A circuit as claimed in claim 1 wherein all members of said series circuit are adapted to be coupled to receive the same supply current.

10. A circuit comprising a first controlled source having a main conduction path and a control electroce, an input means adapted to receive an input signal coupled to said control electrode, a series circuit having a signal current flowing therethrough and comprising in succession first impedance means and said conduction path, second impedance means having an impedance that is a function of the amplitude and frequency of the signal applied to said second impedance means, said second impedance means being parallel coupled to said series circuit, whereby a junction is formed between said first source and said second impedance means, a current source coupled to said junction and an output means coupled to one of said impedance means for supplying an output signal, whereby the transfer function between said input and output means is a function of both the frequency and amplitude of said input signal.

11. A circuit as claimed in claim 10 wherein said current source comprises a second controlled source having a main conduction path coupled in series with a third impedance means having a value equal to that of the first impedance means, and a control electrode; and a reference voltage source coupled to said second controlled source control electrode.

12. A circuit as claimed in claim 11 further comprising switching means having a first position for coupling said input means to said first controlled source control electrode, said output means to said first impedance means, and said reference voltage source to said second controlled source control electrode; and a second position for coupling the input signal to said second controlled source control electrode, said output means to said second impedance means, and for breaking the coupling between said first controlled source and said first impedance means.

* * * * *